1,896,747

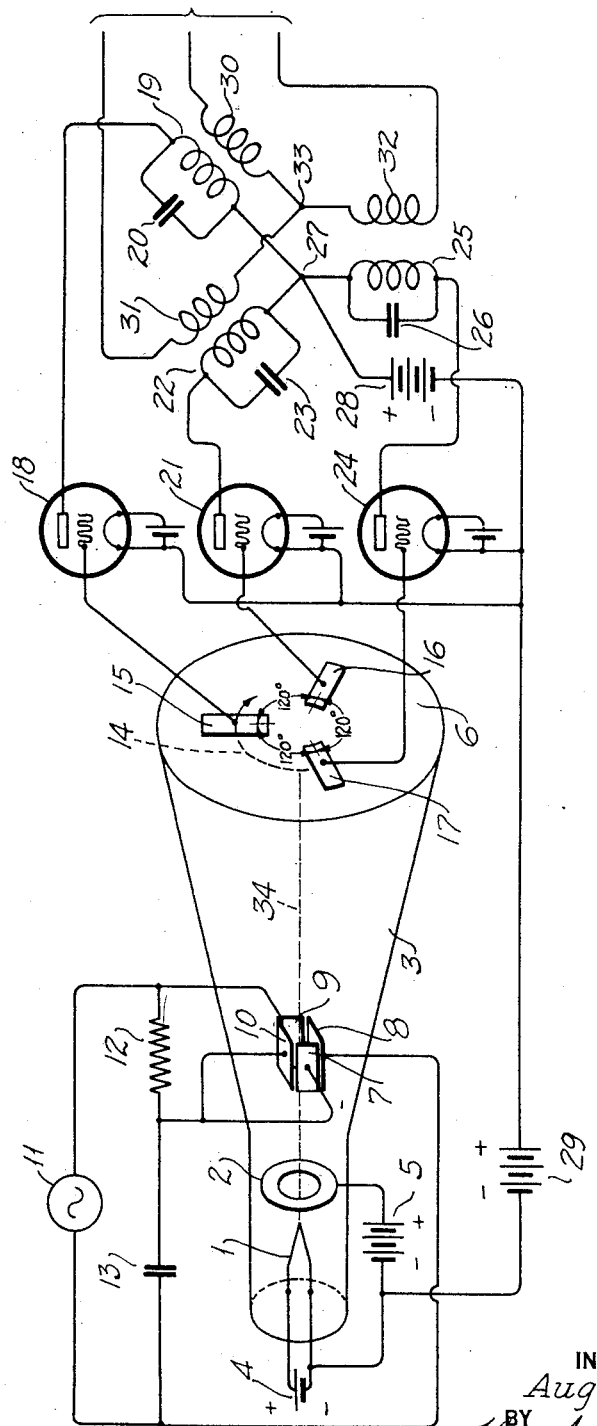
Feb. 7, 1933.  A. HUND  1,896,747
PHASE MULTIPLIER
Filed Nov. 20, 1930
INVENTOR
*August Hund.*
BY
*Wm. J. Herdman*
ATTORNEY Patented Feb. 7, 1933

UNITED STATES PATENT OFFICE

AUGUST HUND, OF WEST ORANGE, NEW JERSEY, ASSIGNOR TO WIRED RADIO, INC., OF NEW YORK, N. Y., A CORPORATION OF DELAWARE

PHASE MULTIPLIER

Application filed November 20, 1930. Serial No. 496,841.

My invention pertains in general to systems for producing polyphase current and specifically relates to a phase multiplier employing a cathode ray tube.

One of the objects of my invention consists in providing a system for producing phase multiplication by simple and convenient means.

Another object of my invention consists in producing a phase multiplier adapted to operate at extremely high frequencies.

A further object comprises producing a phase multiplier employing a cathode ray tube having a plurality of external electrodes connected to a plurality of resonant circuits interconnected in polyphase manner.

I accomplish the above desirable objects in a novel type of phase multiplier utilizing a cathode ray tube and means for deflecting the cathode ray to successively energize a plurality of external electrodes.

In the drawing I have schematically represented one embodiment of the phase multiplier of my invention.

It has been heretofore known in the art to produce phase multiplication by a cathode ray tube as disclosed in United States Patent 1,763,309, issued June 10, 1930, to Clinton W. Hough. However, I am not aware that any system has been heretofore disclosed for producing phase multiplication by a cathode ray tube having external electrodes. The use of external electrodes for cathode ray phase multipliers offers advantages which can not be obtained from a cathode ray system having internal electrodes. For example, the phase angle as well as the number of phases can be quickly and conveniently changed in a simple manner by the use of external electrodes as hereinafter disclosed.

Referring to the drawing in detail, I provide a cathode ray tube having a cathode 1 and an anode 2 disposed within an evacuated envelope 3. The envelope 3 can be composed of a suitable substance such as glass or fused quartz. The cathode 1 is connected to battery 4 and the anode 2 is connected through battery 5 to cathode 1. The anode 2 is provided with an aperture which permits the electronic discharge, or cathode ray, emitted from the cathode 1, and indicated by the dotted line 34, to be projected to the face 6 of the envelope 3. Such an arrangement comprises a normal type of cathode ray tube well known in the art.

Four electrodes 7, 8, 9, and 10 are mounted, insulated from each other, within the envelope 3 in a manner, as shown, to enclose the path of the cathode ray emerging from the anode 2. The electrodes 8 and 9 are directly connected to a source of alternating current 11, while the electrodes 10 and 7 are connected through the resistance 12 and the condenser 13 to the source of alternating current 11. This arrangement comprises a well known expedient for producing a revolving field from a source of alternating current. The revolving field so produced acts upon the cathode ray emerging from the anode 2 to cause the same to describe an orbit upon the face 6 of the envelope 3 as indicated by the dotted arrow 14.

Arrangements similar to that shown for causing the deflection of a cathode ray have long been used in association with cathode ray tubes. Electromagnetic fields can also be used for deflecting cathode rays. If desired, means may be provided in my phase multiplier system for producing an electromagnetic field to deflect the cathode ray instead of the means for producing an electrostatic field here shown. It is to be understood that the exact arrangement for deflecting the cathode ray under control of an alternating current is well known in the art and does not constitute part of my invention.

For purposes of description, I have arbitrarily chosen to represent an embodiment of my system for producing three phase current from single phase current. However, as will be hereinafter pointed out, the system is adapted for producing any number of phases at any phase angle. For producing three phase current from single phase current, I provide three electrodes 15, 16, and 17 externally positioned on the face 6 of the envelope 3 and displaced from each other in the path described by the cathode ray by 120 angular degrees. These electrodes are composed of a metal such as nickel and are cemented upon the surface of the face 6 of the containing envelope. The electrode 15 is connected through a space discharge amplifier 18 to a resonant circuit comprising an inductance 19 and capacitance 20. The electrode 16 is connected through a space discharge amplifier 21 to a resonant circuit comprising an inductance 22 and capacitance 23, while the electrode 17 is connected through space discharge amplifier 24 to a resonant circuit comprising inductance 25 and capacitance 26. The inductances 19, 22, and 25 are interconnected in Y formation at a central point 27. The central point 27 of the Y formation is connected through a source of high potential 28 to a parallel connection with the cathodes of the space discharge amplifiers 18, 21, and 24 and thence through another source of high potential 29 to the cathode 1, as shown. The inductances 19, 22, and 25 are electromagnetically coupled to inductances 30, 31, and 32 also interconnected in Y formation at a central point 33. These inductances 30, 31, and 32 form a work circuit for the utilization of the three phase current set up in the resonant circuits 19—20, 22—23, and 25—26.

To produce phase multiplication according to my system, a single phase alternating current is fed from the source 11 to the electrodes 7, 8, 9, and 10 to produce a rotating field within the envelope 3. This rotating field causes the electronic discharge, or cathode ray, emerging through the anode 2 to describe an orbit upon the face 6 of the envelope 3. I have found, in experiments, that the cathode ray will induce a charge in an external electrode when the cathode ray impinges upon the envelope at a point immediately adjacent the external electrode. As the cathode ray is moved to describe an orbit, as indicated by the arrow 14, the electrodes 15, 16, and 17 are successively energized. Since in the present embodiment of my invention the external electrodes are angularly displaced from each other by 120° it will be obvious that a time interval will elapse between the energization of each of the electrodes which will be equal to one-third of the time required for the cathode ray to describe an orbit. Inasmuch as one cycle of the alternating current from the source 11 is required to revolve the cathode ray once around its orbit, it is evident that the energization of each of the three electrodes 15, 16, and 17 will take place at 0°, 120°, and 240° intervals of the one 360° cycle of the alternating current from the source 11. In other words, the angular displacement of the external electrodes on the face 6 is equal to the phase displacement between the charges induced in the electrodes. These charges, then, are produced in three-phase relationship and when respectively amplified by the space discharge amplifiers 18, 21, and 24 induce a three phase current in the Y-connected inductances 30, 31, and 32 by means of the Y-connected resonant circuits 19—20, 22—23, and 25—26. The three phase current set up in the work circuit comprising the inductances 30, 31, and 32 will, in effect, be a three phase multiplication of the single phase current from the source 11. Inasmuch as the cathode ray employed for phase multiplication is substantially without inertia, it will be obvious that the source 11 may supply very high frequency alternating current, if desired, to produce polyphase high frequency current in the output, or work circuit, of my system.

It is an especial feature of my invention that the external electrodes can be affixed, or arranged, in a convenient manner without disturbing the internal functions of the cathode ray tube. For example, any number of electrodes can be used to produce any number of phases, while at the same time the electrodes can be angularly displaced from each other to produce any desired manner of phase displacement. Although I have shown a preferred embodiment of my phase multiplier, it is, of course, to be understood that changes can be made therein without departing from the intended scope of my invention. I do not, therefore, desire to limit myself to the foregoing except insofar as may be pointed out in the appended claims.

What I claim as new and original and desire to secure by Letters Patent of the United States is:

1. A phase multiplier comprising, an electron discharge device, a plurality of electrodes exteriorly positioned on said discharge device, means for deflecting the electron discharge within said device to successively energize said electrodes by electrostatic induction, a plurality of thermionic amplifiers each having input and output circuits, a resonant circuit in each of said output circuits and interconnected in polyphase manner, a source of anode potential connected to said output circuits, and connections between said electrodes and said input circuits for successively energizing said resonant circuits to produce polyphase current.

2. A phase multiplier comprising, a plurality of thermionic amplifiers each having input and output circuits, a plurality of resonant circuits interconnected in polyphase manner, each of said resonant circuits containing inductance and capacitance and each connected respectively with the output circuit of one of said thermionic tubes, a common source of anode potential for said amplifiers, and means for successively energizing the input circuits of said thermionic amplifiers to produce polyphase current, said means comprising a cathode ray tube having a plurality of electrodes exteriorly positioned on said tube and each of said electrodes being connected to the input circuit of one of said amplifiers and adapted to be energized by electrostatic induction.

3. A phase multiplier comprising, an evacuated envelope, means for producing an electronic discharge within said envelope, a plurality of electrodes exteriorly positioned with reference to said envelope, a source of alternating current, means under control of said alternating current for moving said electronic discharge to successively energize said electrodes by electrostatic induction, a plurality of thermionic amplifiers each having input and output circuits, a plurality of resonant circuits interconnected in polyphase manner and through a source of direct current potential to the output circuits of said thermionic amplifiers, and each of said exterior electrodes being connected to the input circuit of a different one of said thermionic amplifiers.

AUGUST HUND.